United States Patent Office 3,205,267
Patented Sept. 7, 1965

3,205,267
PRODUCTION OF 2,2,3,3-TETRACHLOROSUCCIN-
IC DIALDEHYDE MONOHYDRATE AND AN
ADDUCT THEREOF
Franz Reicheneder and Karl Dury, Ludwigshafen (Rhine), Germany, assignors to Badische Anilin- & Soda-Fabrik Aktiengesellschaft, Ludwigshafen (Rhine), Germany
No Drawing. Filed Aug. 21, 1962, Ser. No. 218,447
Claims priority, application Germany, Aug. 31, 1961,
B 63,849
15 Claims. (Cl. 260—601)

This invention relates to 2,2,3,3-tetrachlorosuccinic dialdehyde monohydrate and an adduct of 2,2,3,3-tetrachlorosuccinic dialdehyde with 2,2,3,3-tetrachlorobutanediol-(1,4) and water. The invention also relates to processes of producting said compounds.

It has been proposed to prepare a mixture of 2,2,3,3-tetrachlorobutanediol and mucochloric acid by chlorination of butynedoil-(1,4) in aqueous or aqueous mineral acid medium with the coemployment of agents promoting the reaction. Suitable reaction promoters are: irradiation with light, as well as additions of tin, molybdenum, tungsten, vanadium, chromium, manganese, iron or cobalt.

It is an object of the invention to produce the hitherto unknown 2,2,3,3-tetrachlorosuccinic dialdehyde monohydrate and an addition product thereof with 2,2,3,3-tetrachlorobutanediol-(1,4) and water, which addition product can be separated into its components. It is a further object of the invention to provide a process whereby butynediol-(1,4) and chlorine are reacted to an addition product of 2,2,3,3-tetrachlorosuccinic dialdehyde, tetrachlorobutanediol-(1,4) and water.

These objects are achieved by subjecting butynediol-(1,4) in an aqueous solution containing mineral acid to the action of chlorine at a temperature of about 0° C. up to about 130° C. in the presence of copper or a copper compound.

The new process leads to the formation of a molecular compound consisting of 2 molecules of 2,2,3,3-tetrachlorosuccinic dialdehyde, 1 molecule of 2,2,3,3-tetrachlorobutanediol and 2 molecules of water. For many purposes it is possible to use this addition product as if it were 2,2,3,3-tetrachlorosuccinic dialdehyde monohydrate. Surprisingly, the presence of copper or of a copper compound in an aqueous mineral acid medium has the effect that not only is chlorine attached to the acetylene carbons, but also oxidation of the hydroxymethyl groups to aldehyde groups takes place.

The butynediol-(1,4) may be employed in pure form. However, it is preferably employed in the form of an aqueous solution of 10 to 50% strength. The preferred concentration of the butynediol-(1,4) solutions lies between 20 and 40% by weight. It is not necessary to start from butynediol-(1,4) as a substance. Aqueous solutions of technical butynediol-(1,4), obtained by reaction of aqueous formaldehyde with acetylene, may also be used.

The new process is carried out in the presence of a strong or medium-strong aqueous mineral acid, i.e., in a solution of a mineral acid having a dissociation constant of at least $10^{-4}$. Examples of suitable acids are hydrochloric, phosphoric, perchloric and nitric acids. By far the best results are achieved by using aqueous sulfuric acid.

The amount and concentration of the acid used are determined on the one hand by the acidity of the reaction mixture which should be pH 2 or lower, and on the other hand by the highest concentration at which no reaction of the acid with the butynediol-(1,4) or with the reaction products occurs. It may be as high as 80% by weight with reference to the total mixture. The upper limit thus depends on the nature of the acid used. Commonly the acid concentration lies between 1 and 40% by weight, but it is preferred to employ the acids in a concentration of 1 to 20% by weight. The optimum concentration can be determined by a simple preliminary experiment.

The ratio by weight of butynediol-(1,4) to the sum of mineral acid and water is advantageously in the range of 3:97 to 50:50. The preferred range is 5:95 to 25:75.

It is an essential feature of the method according to the invention that the action of chlorine on the starting material takes place in the presence of copper or a copper compound. When metallic copper is employed as catalyst, it should be present in the finest possible distribution. Particularly good results are obtained with copper (I) and copper (II) salts, such as cupric chloride, cuprous chloride, cuprous sulfate, cupric nitrate, cuprous nitrate, copper acetyl acetonate, or cupric acetate. Other suitable copper compounds are copper acetylides, copper oxide and copper sulfide.

The type of copper compound used is not important, as under the reaction conditions at least some cupric chloride is formed, the ion of which possibly acting as catalyst. As a rule, the copper catalysts are used in amounts of from 0.1 to 30% by weight, preferably from 1 to 5% by weight with reference to the sum of butynediol-(1,4), water and mineral acid. However, it is possible to use higher copper concentrations up to the limit set by the solubility of the copper compound used.

The process is advantageously carried out at a temperature between 0° and 100° C., especially between 50° and 80° C. At temperatures below 0° C., the rate of reaction is too low, at temperatures above 130° C. undesirable by-products occur to an increasing extent.

It is advantageous to use the chlorine in gaseous form. The operation is generally conducted under atmospheric pressure, but it is also possible to work under reduced or increased pressure.

At least a stoichiometric amount of chlorine is used, i.e., 10 moles of chlorine to 3 moles of butynediol. It is recomended to use an excess of chlorine, advantageously an amount between about 3.3 and 20 moles of chlorine per mole of butynediol-(1,4). A larger excess of chlorine gives no significant improvement.

The process may be carried out, for example, by introducing chlorine into a mineral acid solution of butynediol-(1,4) which contains the copper catalyst. It is, however, also possible to place in the reaction vessel only the aqueous mineral acid and the copper catalyst and then to introduce chlorine and butynediol-(1,4) separately, but simultaneously. The chlorination may easily be performed in a continuous manner. It is possible to work in countercurrent as well as in cocurrent, and the chlorine, or chlorine and butynediol-(1,4), may be supplied from either the bottom or the top.

The reaction product is recovered from the reaction mixture in a simple way by cooling, preferably to —5° to 20° C., if necessary after previous concentration of the mixture. The above-mentioned addition compound precipitates in crystalline form and may, after separation, be further purified by recrystallization. The addition compound consists of two molecules tetrachlorosuccinic dialdehyde, one molecule tetrachlorobutanediol-(1,4), and two molecules water. The 2,2,3,3-tetrachlorosuccinic dialdehyde monohydrate can be recovered from the addition compound, for example, by reacting the addition compound with aniline and decomposing the aniline adduct by heating it with dilute mineral acid. The addition compound can be converted into the methyl acetal of 2,2,3,3-tetrachlorosuccinic acid dialdehyde by reaction with methanolic hydrochloric acid.

Both the adduct and 2,2,3,3-tetrachlorosuccinic aldehyde monohydrate have nematocidal, insecticidal and fungicidal properties.

For example, vine leaves may be efficiently prevented from being affected by downy mildew by a single spraying with an 0.1% by weight aqueous emulsion of 2,2,3,3-tetrachlorosuccinic aldehyde monohydrate using sodium lignin sulfonate as emulsifier.

The addition product is furthermore a valuable intermediate product, for example, for the production of difficultly flammable plastics and of tetrachlorosuccinic acid, which is useful as acid component for the production of difficultly flammable polyester resins as described in German printed application No. 1,085,516.

The invention is illustrated by, but not limited to, the following examples. The parts and percentages are by weight, unless otherwise specified. Their relation to parts and percentages by volume is that of gram to liter.

*Example 1*

Into a packed vertical reaction column which has been charged with 10% sulfuric acid containing 3% cupric chloride, there are continuously introduced from below 300 parts by volume (S.T.P.) of chlorine gas and 0.3 part by volume of 30% aqueous butynediol-(1,4) solution per hour. The reaction mixture separates in a globular separator into liquid and gaseous phase. The liquid phase is returned to the reaction column through a circulation tube, while the gaseous phase is drawn off. The temperature in the whole system is adjusted to 75°–80° C. by heating means arranged in the circulation tube. The total amount of aqueous sulfuric acid present in the reaction vessel and in the circulation tube is 4.5 parts by volume. After 7 hours, the supply of butynediol solution is interrupted and after another quarter of an hour the introduction of chlorine is also terminated. Altogether 600 parts 100% butynediol-(1,4) is fed into the apparatus within the said period.

The hot reaction mixture is now allowed to drain off and is cooled with stirring to 0° C., 510 parts of a crystalline precipitate separating. The precipitate is filtered off and washed with a little water. The filtrate and wash water are concentrated to a total volume of 4.5 parts by volume and returned to the chlorination apparatus. By the following procedure described, 1080, 1320, and 1100 parts of crystalline precipitate are obtained successively.

The combined crystalline precipitates (4010 parts, i.e., 60.6% of the theoretical yield) are recrystallized from water. Fine white needles having the melting point 198° to 202° C. are obtained. After further recrystallizations, twice from water and once from benzene, a sample has the melting point 204° to 205° C.

*Analysis.*—$C_{12}H_{14}Cl_{12}O_8$ (2 molecules 2,2,3,3-tetrachlorosuccinic acid dialdehyde+1 molecule 2,2,3,3-tetrachlorobutanediol+2 molecules water; molar weight 711.72). Calculated: C, 20.2; H, 2.0; O, 18.0; Cl, 59.4; active H, 0.85. Found: C, 20.5; H, 1.9; O, 18.2; Cl, 59.4; active H, 0.77.

Practically identical results are achieved by charging the column with 100 parts fine copper powder or 120 parts cupric oxide and 10% sulfuric acid.

*Aniline derivative of tetrachlorosuccinic dialdehyde.*—71 parts of the addition compound is dissolved in 100 parts methanol and 30 parts water is added and the mixture treated with 18.5 parts of aniline slowly and with efficient stirring. The mixture is heated briefly to boiling. After reducing its volume by half, there is precipitated on cooling 50 parts of a crystalline product which, after recrystallization from benzene, melts at 141.5° C.

*Analysis.*—$C_{10}H_9Cl_4O_2N$ (molar weight 317.00). Calculated: C, 37.9; H, 2.8; Cl, 44.8; N, 4.4. Found: C, 37.8; H, 3.1; Cl, 45.4; N, 4.6.

*2,2,3,3-tetrachlorosuccinic dialdehyde monohydrate.*—26 parts of the aniline derivative is heated with 80 parts 18% hydrochloric acid, active carbon is added and the solution filtered while hot. By concentrating and cooling the filtrate, 18 parts, i.e., 91% of the theory, 2,2,3,3-tetrachlorosuccinic dialdehyde monohydrate of the melting point 191° C. after recrystallization from benzene is obtained. The compound is readily soluble in water. Nuclear magnetic resonance and infrared spectra indicate the structure of a cyclic hemihydrate of 2,2,3,3-tetrachlorosuccinic dialdehyde:

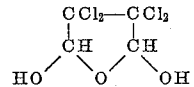

*Analysis.*—$C_4H_4O_3Cl_4$ (molecular weight 242). Calculated: C, 19.85; H, 1.65; Cl, 58.7; O, 19.85. Found: C, 19.9; H, 2.3; Cl, 58.5; O, 19.3.

*2,2,3,3-tetrachlorosuccinic acid.*—150 parts 98% nitric acid is poured over 50 parts of the adduct of 2,2,3,3-tetrachlorosuccinic dialdehyde, 2,2,3,3-tetrachlorobutanediol-(1,4) and water. 15 parts 2,2,3,3-tetrachlorosuccinic acid of the melting point 194° to 195° C. separates upon standing for several days at room temperature.

*Example 2*

The procedure is as described in Example 1 except that 5% sulfuric acid is used that contains 20% cupric chloride. The reaction temperature lies between 60° and 70° C. From every 600 parts of butynediol-(1,4), the first batch yields 835 parts and the second 880 parts of the addition compound.

*Example 3*

The procedure of Example 1 is followed, but a solution of 5% cupric chloride in 2% sulfuric acid is used at a temperature of 30° to 40° C. From 600 parts butynediol-(1,4), 700 parts of adduct is obtained.

*Example 4*

The procedure of Example 1 is followed, but a solution of 15% cupric sulfate ($CuSO_4 \cdot 5H_2O$) in 36% hydrochloric acid is used at a temperature of 70° to 80° C. Within 7 hours, 990 parts addition compound is obtained from 600 parts butynediol-(1,4) in the first passage.

Similar results are obtained by using, instead of 15% cupric sulfate solution, a 10% solution of cupric acetylacetonate in 36% hydrochloric acid.

*Example 5*

The procedure of Example 1 is followed, but the column is charged with a 2% solution of cupric nitrate ($Cu(NO_3)_2 \cdot 3H_2O$). The reaction temperature is maintained at 68° to 75° C. From 1200 parts butynediol-(1,4), 750 parts addition product is obtained within 7 hours.

*Example 6*

The procedure of Example 1 is followed, but the column is charged with a solution of 10% cupric sulfate ($CuSO_4.5H_2O$) in 5% phosphoric acid. From 540 parts butynediol-(1,4), 220 parts adduct is obtained in the first passage at a temperature of 70° C. within 7 hours.

*Example 7*

The procedure of Example 1 is followed, but a 12% solution of cupric sulfate ($CuSO_4.5H_2O$) in 2% nitric acid is used. The reaction temperature is 75° C. From 300 parts butynediol-(1,4), 130 parts adduct is obtained within 7 hours.

*Example 8*

The procedure of Example 1 is followed, but a 3% solution of cupric acetate in 7% sulfuric acid is used. The reaction temperature is 63° to 67° C. From 540 parts butynediol-(1,4), 430 parts addition compound is obtained in the first passage within 7 hours.

We claim:
1. 2,2,3,3-tetrachlorosuccinic dialdehyde monohydrate.
2. The adduct of 2,2,3,3-tetrachlorosuccinic aldehyde with 2,2,3,3-tetrachlorobutanediol-(1,4) and water in the molar ratio of 2:1:2.
3. A process for the production of 2,2,3,3-tetrachlorosuccinic dialdehyde in the form of an adduct with 2,2,3,3-tetrachlorobutanediol-(1,4) and water which comprises: subjecting butynediol-(1,4) in an aqueous solution containing a mineral acid and at least one member selected from the group consisting of copper and copper compounds to the action of chlorine in a molar ratio of chlorine to butynediol-(1,4) of at least about 10:3 at a temperature of about 0° to about 130° C.
4. A process as claimed in claim 3, wherein an aqueous mineral acid is used with a concentration up to 80% by weight.
5. A process as claimed in claim 3, wherein the molar ratio of chlorine to butynediol-(1,4) lies in the range of from 3.3:1 to 20:1.
6. A process as claimed in claim 3, wherein a weight ratio of butynediol-(1,4) to aqueous mineral acid of from 3:97 to 50:50 is employed.
7. A process for the production of 2,2,3,3-tetrachlorosuccinic dialdehyde in the form of an adduct with 2,2,3,3-tetrachlorobutanediol-(1,4) and water which comprises: reacting chlorine with butynediol-(1,4) in an aqueous mineral acid solution having an acid concentration of about 1 to 80% by weight and containing as a catalyst at least one member selected from the group consisting of copper and copper compounds, in a molar ratio of chlorine to butynediol-(1,4) of about 3.3:1 to 20:1 and at a temperature of about 0° C. to about 100° C.
8. A process as claimed in claim 7 wherein said mineral acid has a dissociation constant of at least $10^{-4}$.
9. A process as claimed in claim 7 wherein said mineral acid is sulfuric acid.
10. A process as claimed in claim 7 wherein the acid concentration is about 1 to 40% by weight.
11. A process as claimed in claim 7 wherein the acid concentration is about 1 to 20% by weight.
12. A process as claimed in claim 7 wherein the weight ratio of butynediol-(1,4) to the aqueous mineral acid is about 3:97 to 50:50.
13. A process as claimed in claim 7 wherein the weight ratio of butynediol-(1,4) to the aqueous mineral acid is about 5:95 to 25:75.
14. A process as claimed in claim 7 wherein said catalyst is present in an amount of about 0.1 to 30% by weight with reference to the sum of butynediol-(1,4) and aqueous mineral acid.
15. A process as claimed in claim 7 wherein the reaction temperature is between about 50° C. and 80° C.

References Cited by the Examiner

UNITED STATES PATENTS

| | | | |
|---|---|---|---|
| 2,011,317 | 8/35 | Groll | 260—603 |
| 3,054,739 | 9/62 | Reicheneder et al. | 260—633 |

JOSEPH R. LIBERMAN, *Primary Examiner.*
LEON ZITVER, *Examiner.*